United States Patent
Lee et al.

(10) Patent No.: US 11,230,201 B2
(45) Date of Patent: Jan. 25, 2022

(54) SYSTEM OF CHARGING BATTERY OF VEHICLE AND METHOD FOR CONTROLLING THE SAME

(71) Applicants: Hyundai Motor Company, Seoul (KR); Kia Motors Corporation, Seoul (KR)

(72) Inventors: Dae Woo Lee, Incheon (KR); Min Seong Choi, Daejeon (KR); In Yong Yeo, Gyeonggi-do (KR); Tae Jong Ha, Seoul (KR); Jin Myeong Yang, Gyeonggi-do (KR); Woo Young Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 190 days.

(21) Appl. No.: 16/679,469

(22) Filed: Nov. 11, 2019

(65) Prior Publication Data
US 2021/0078422 A1 Mar. 18, 2021

(30) Foreign Application Priority Data
Sep. 18, 2019 (KR) .................. 10-2019-0114657

(51) Int. Cl.
*B60L 53/22* (2019.01)
*H02J 7/02* (2016.01)
(Continued)

(52) U.S. Cl.
CPC ............ *B60L 53/22* (2019.02); *B60L 50/66* (2019.02); *H02J 7/022* (2013.01);
(Continued)

(58) Field of Classification Search
CPC .. B60L 53/22; B60L 50/66; H02J 7/022; H02J 7/345; H02M 1/4225; H02M 3/33584
(Continued)

(56) References Cited

U.S. PATENT DOCUMENTS 9,257,864 B2 * 2/2016 Pahlevaninezhad et al. ............... H02J 7/022
9,595,840 B2 * 3/2017 Miller .................. H02J 7/0042
(Continued)

FOREIGN PATENT DOCUMENTS

| KR | 20130090678 A | 8/2013 |
| KR | 20140084369 A | 7/2014 |

*Primary Examiner* — Sun J Lin
(74) *Attorney, Agent, or Firm* — Mintz Levin Cohn Ferris Glovsky and Popeo, P.C.; Peter F. Corless

(57) ABSTRACT

A system of charging a battery of a vehicle is provided. The system includes a charger having a direct current (DC) capacitor to which a DC voltage converted from an AC charge voltage is applied and a first DC converter that converts a magnitude of a voltage of the DC capacitor. A first battery is connected to the first DC converter and is charged with a DC voltage converted by the first DC converter. A second DC converter is connected to the battery and converts a magnitude of a voltage of the battery. A second battery receives a DC voltage converted by the second DC converter. A controller charges the DC capacitor up to a predetermined initial charge voltage using power stored in the second battery by operating the second DC converter and the first DC converter in a backward direction before the AC charge voltage is provided to the charger.

11 Claims, 3 Drawing Sheets

(51) Int. Cl.
  *H02M 3/335* (2006.01)
  *H02M 1/42* (2007.01)
  *B60L 50/60* (2019.01)
  *H02J 7/34* (2006.01)
  *H02M 7/06* (2006.01)

(52) U.S. Cl.
  CPC ..... *H02M 1/4225* (2013.01); *H02M 3/33584* (2013.01); *B60L 2210/10* (2013.01); *B60L 2210/30* (2013.01); *H02J 7/345* (2013.01); *H02M 7/06* (2013.01)

(58) Field of Classification Search
  USPC ........................................................ 320/109
  See application file for complete search history.

(56)  References Cited

U.S. PATENT DOCUMENTS

| | | | |
|---|---|---|---|
| 10,640,001 B2* | 5/2020 | Kim et al. | H02P 27/08 |
| 10,840,820 B2* | 11/2020 | Yang et al. | H02M 7/043 |
| 2020/0186048 A1* | 6/2020 | Yang et al. | H02M 1/44 |
| 2021/0155100 A1* | 5/2021 | Khaligh et al. | B60L 53/62 |

* cited by examiner

SYSTEM OF CHARGING BATTERY OF VEHICLE AND METHOD FOR CONTROLLING THE SAME

CROSS REFERENCE TO RELATED APPLICATION

The present application claims priority to Korean Patent Application No. 10-2019-0114657, filed Sep. 18, 2019, the entire contents of which is incorporated herein for all purposes by this reference.

BACKGROUND

Field of the Invention

The present invention relates to a system of charging a battery of a vehicle and a method for controlling the system and, more particularly, to a system of charging a battery of a vehicle that prevents a direct current (DC)) capacitor in a charger from malfunctioning due to a rapid variation in input voltage by charging the DC capacitor before charge power is supplied without using a separate initial charge resistor, and a method for controlling the system.

Description of the Related Art

An electric vehicle or a plug-in hybrid vehicle is equipped with a charger for charging a battery that maintains electrical energy that is the source of the vehicle. The charger converts common alternating current (AC) power input from the outside into DC power, converts the magnitude to have a voltage suitable for charging the battery, and then supplies the power to the battery.

The charger includes a DC link capacitor therein to convert AC power into DC and DC power and then maintain the DC power. The DC link capacitor is connected between a power factor correction circuit and a DC-DC converter that are disposed in common chargers, and maintains DC power converted by the power factor correction circuit at a predetermined voltage. The DC-DC converter converts the magnitude of the maintained voltage and then applies the voltage to the battery, whereby the battery is charged.

When charging is started, high-voltage power is supplied from an external charging facility to the power factor correction circuit, and when the high voltage is rapidly applied to the DC link capacitor, the DC link capacitor may malfunction. Accordingly, in the related art, a method has been developed for providing a separate initial charge resistor between a connection terminal, which is connected to an external charging facility, and a charger to provide power through the initial charge resistor in the early stage in which power is supplied from an external charge facility and then charge power of the external charge facility is supplied directly to the charge of a vehicle not through the initial charging resistor after the DC link capacitor is charged. However, this initial charging method of the related art requires a separate initial charge resistor, and increases the manufacturing process of a vehicle due to the high cost of the initial charge resistor.

The description provided above as a related art of the present invention is merely for helping understanding the background of the present invention and should not be construed as being included in the related art known by those skilled in the art.

SUMMARY

Accordingly, an objective of the present invention is to provide a system of charging a battery of a vehicle, the system enabling initial charging to be able to prevent malfunctioning of a DC link capacitor in a charger when charging a vehicle even if there is no separate initial charge resistor, and a method for controlling the system.

An aspect of the present invention provides a system of charging a battery of a vehicle that may include: a charger having a DC capacitor to which a DC voltage converted from an AC charge voltage is applied, and a first DC converter configured to convert the magnitude of a voltage of the DC capacitor; a first battery connected to the first DC converter and being charged with a DC voltage converted by the first DC converter; a second DC converter connected to the battery and configured to convert a magnitude of a voltage of the battery; a second battery configured to receive a DC voltage converted by the second DC converter; and a controller configured to charge the DC capacitor up to a predetermined initial charge voltage using power stored in the second battery by operating the second DC converter and the first DC converter in a backward direction before the AC charge voltage is provided to the charger.

In an exemplary embodiment of the present invention, the first DC converter may include a first bridge circuit and a second bridge circuit each including a plurality of switching elements. Additionally, the first DC converter may include a first transformer disposed between the first bridge circuit and the second bridge circuit and configured to convert and transmit a voltage width between the first and second bridge circuits. The second DC converter may include a third bridge circuit and a fourth bridge circuit each including a plurality of switching elements, and a second transformer disposed between the third bridge circuit and the fourth bridge circuit and configured to convert and transmit a voltage width between the third and fourth bridge circuits. The first bridge circuit may be connected to the DC capacitor, the second bridge circuit may be connected to the first battery, the third bridge circuit may be connected to the first battery, and the fourth bridge circuit may be connected to the second battery.

In an exemplary embodiment of the present invention, the controller may be configured to charge the DC capacitor up to the initial charge voltage by converting and applying the voltage of the second battery to the DC capacitor by operating the switching elements included in the first to fourth bridge circuits. In addition, the controller may be configured to charge the DC capacitor up to the initial charge voltage by converting and applying the voltage of the second battery to the DC capacitor by fixing duties of the switching elements included in the first to third bridge circuits and adjusting duties of the switching elements included in the fourth bridge circuit.

The first DC converter may include a first bridge circuit and a second bridge circuit each including a plurality of switching elements, and a first transformer disposed between the first bridge circuit and the second bridge circuit and configured to convert and transmit a voltage width between the first and second bridge circuits. The second DC converter may include a third bridge circuit including a plurality of switching elements, and a second transformer disposed between the third bridge circuit and the second bridge circuit and configured to convert and transmit a voltage width between the third and fourth bridge circuits. The first bridge circuit may be connected to the DC capacitor, the second bridge circuit may be connected to the first battery, and the third bridge circuit may be connected to the second battery.

In an exemplary embodiment of the present invention, the controller may be configured to charge the DC capacitor up to the initial charge voltage by converting and applying the voltage of the second battery to the DC capacitor by operating the switching elements included in the first to third bridge circuits. In addition, the controller may be configured to charge the DC capacitor up to the initial charge voltage by converting and applying the voltage of the second battery to the DC capacitor by fixing duties of the switching elements included in the first and second bridge circuits and adjusting duties of the switching elements included in the third bridge circuit.

The system may further include: a charge input terminal to which the AC charge voltage may be input; and a relay connected between the charge input terminal and the charger, in which the controller may be configured to change the relay into a short state after charging the DC capacitor up to a predetermined initial charge voltage using power stored in the second battery by operating the second DC converter and the first DC converter in a backward direction when receiving a charge start signal for starting to charge the first battery with the relay open. The controller may be configured to monitor a state of charge (SOC) of the second battery, and charge the DC capacitor up to a predetermined initial charge voltage using power stored in the first battery by operating the first DC converter in a backward direction before the AC charge voltage is provided to the charger when the state of charge of the second battery is less than a predetermined reference value.

An another aspect of the present invention provides a method for controlling a system of charging a battery of a vehicle, the system including: a charger having a DC capacitor to which a DC voltage converted from an AC charge voltage is applied, and a first DC converter configured to convert the magnitude of a voltage of the DC capacitor; a first battery connected to the first DC converter and being charged with a DC voltage converted by the first DC converter; a second DC converter connected to the battery and configured to convert a magnitude of a voltage of the battery; a second battery configured to receive a DC voltage converted by the second DC converter; and a relay connected between a charge input terminal to which the AC charge voltage is input and the charger.

In particular, the method may include: receiving a charge start signal for starting to charge the first battery with the relay open; charging the DC capacitor up to a predetermined initial charge voltage using power stored in the second battery by operating the first DC converter and the second DC converter in a backward direction; and charging the first battery by changing the relay into a short state and operating the first DC converter in a forward direction to apply a voltage converted from the AC charge power to the first battery.

In an exemplary embodiment of the present invention, the method may further include: monitoring a state of charge (SOC) of the second battery before the charging of the first battery; and charging the DC capacitor up to a predetermined initial charge voltage using power stored in the first battery by operating the first DC converter in a backward direction when the state of charge of the second battery is less than a predetermined reference value.

According to the system of charging a battery of a vehicle and the method for controlling the system, it may be possible to initially charge a DC capacitor in a charger before supplying charge power even without using a separate initial charge resistor. Therefore, according to the system of charging a battery of a vehicle and the method for controlling the system, there is no separate initial charge resistor for initially charging the DC capacitor in the charger, and thus, the system may be simplified and the cost for implementing the system may be reduced, resulting in reduction of the manufacturing cost.

The effects of the present invention are not limited to the effects described above and other effects can be clearly understood by those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
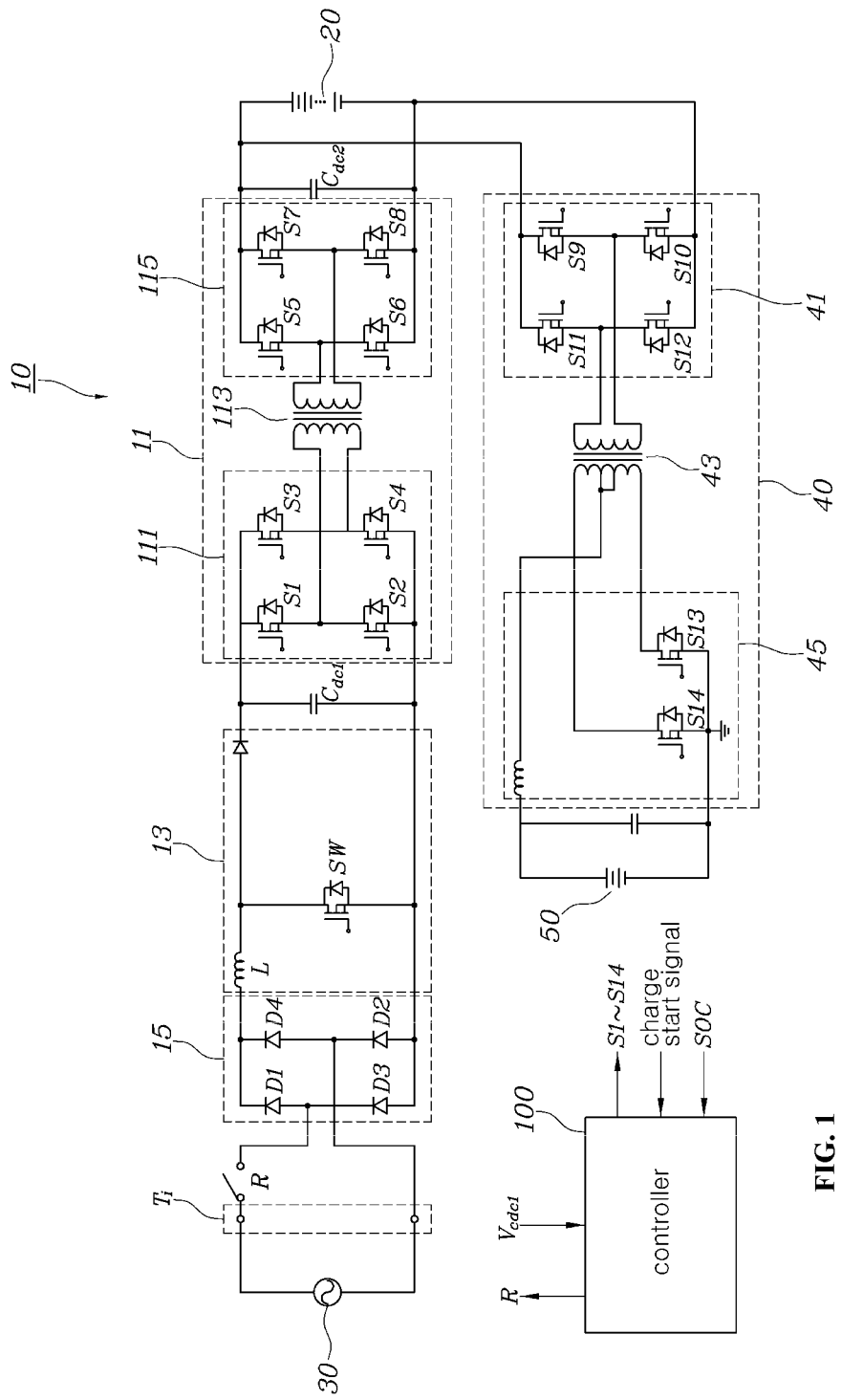
FIG. 1 is a circuit diagram showing a system of charging a battery of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereafter, of charging a battery of a vehicle and a method for controlling the system according to an exemplary embodiment of the present invention are described hereafter in detail with reference to the accompanying drawings.

FIG. 1 is a circuit diagram showing a system of charging a battery of a vehicle according to an exemplary embodiment of the present invention. Referring to FIG. 1, a system of charging a battery of a vehicle according to an exemplary embodiment of the present invention may include: a charger 10 configured to convert an alternating current (AC) charge voltage provided from an external charging facility 30 into a direct current (DC) voltage having a magnitude capable of charging a battery 20 and then providing the DC voltage to the battery 20; the battery 20 being charged with the DC voltage provided from the charger 10; a low voltage DC-DC converter (LDC) 40 configured to convert the magnitude of the voltage of the battery 20; a sub-battery 50 configured to receive the voltage converted by the low voltage DC-DC converter 40; and a controller 100 configured to operate the charger 10 and the low voltage DC-DC converter in charging.

The charger 10, which is an on-board charger (OBC) mounted on a vehicle to charge the battery 20 of a vehicle, is a component configured to convert AC power provided from the external charging facility 30 into DC power having a DC voltage having a magnitude capable of charging the battery 20, and then provides the DC power to the battery 20. The charger 10 may include: a rectifier circuit 15 configured to rectify AC power; a power factor correction circuit 13 configured to convert power rectified by the rectifier circuit 15 into DC power; a DC capacitor Cdc1 that forms a voltage of the DC power converted by the power factor correction circuit 13; and a DC converter 11 configured to convert the magnitude of the DC voltage formed by the DC capacitor Cdc1 into a magnitude that corresponds to a charge voltage of the battery 20. The rectifier circuit 15, which is provided to rectify input AC charge power, may be a full-bridge circuit having four diodes D1~D4.

The power factor correction circuit 13 may be configured to convert and output AC power provided from an external power supply device or the power rectified by the rectifier circuit 150 into DC power and adjust the power factor of transmitted power. For example, the topology of a boost converter composed of an inductor, a switching element, and a diode may be applied to the power factor correction circuit 13. In other words, as shown in FIG. 1, the power factor correction circuit 13 may include: an inductor L having a first end connected to the rectifier circuit 15; a diode D having an anode connected to a second end of the inductor L and a cathode connected to a first end of the DC capacitor Cdc1; and a switching element SW forming/cutting electrical connection between a connection end of the inductor L and the diode D and a second end of the capacitor Cdc1.

The DC converter 11 may be configured to output a voltage having a magnitude suitable for charging the battery 20 by converting the magnitude of the DC voltage formed at the DC capacitor Cdc1 by the power factor correction circuit 13. As shown in FIG. 1, the DC converter 11 may be implemented as a topology of an insulating DC-DC converter circuit including a transformer 113 for electrical insulation. In particular, the DC converter 11 may include: a first bridge circuit 111 having a plurality of switching elements S1~S4 and configured to convert a DC voltage formed at the DC capacitor Cdc1 into an AC voltage; a transformer 113 configured to convert the width of the AC voltage converted by the first bridge circuit 111 into a predetermined turn ratio; and a second bridge circuit 115 having a plurality of switching elements S5~S8, and configured to convert the AC voltage having the width converted by the transformer 113 back into a DC voltage and then provide the DC voltage to the battery 20.

The DC converter 11 may be configured to convert a voltage in an opposite direction (hereafter, a backward direction) to the direction of power flow (hereafter, referred to as a forward direction) in charging. For example, the DC voltage at the battery 20 may be converted into an AC voltage and then input to the transformer 113 by the second bridge circuit 115, the transformer 113 may be configured to convert the AC voltage input from the second bridge circuit 115 and output the AC voltage to the first bridge circuit 111 based on the turn ratio of the transformer 113. The first bridge circuit 111 may be configured to convert the AC voltage input from the transformer 113 and then apply the voltage to the DC capacitor Cdc1. In other words, the DC converter 111 may be a bidirectional converter configured to convert the magnitude of a voltage in two directions.

The magnitude of a voltage converted by the DC converter 111 may be appropriately adjusted by the turn ratio of the transformer 113 and the duty ratios of the switching elements included in the first bridge circuit 111 and the second bridge circuit 115. It may be possible to determine the duty ratios of the switching elements included in the first bridge circuit 111 and the second bridge circuit 115 based on the magnitude relationship of input and output voltages of the controller 100, and it may be possible to control turning-on/off of the switching elements included in the first bridge circuit 111 and the second bridge circuit 115 based on the duty ratios. The output voltage of the second bridge circuit 115 may be applied to an additional DC capacitor Cdc2 that forms voltages at both ends of the battery 20. The topology of the DC converter 111 and the control method thereof described above are well known in the art, so additional detailed description is not provided.

The battery 20 may be configured to store DC energy that is used as power of a motor that generates power for a vehicle and may be referred to as a high-voltage battery or a main battery in the field of environment-friendly vehicle. The power discharged from the battery 20 may be provided to the motor and used to generate torque of the motor, while the power that is stored in the battery 20 may be supplied by converting AC power from the outside using the on-board charger 10. The low voltage DC-DC converter 40 may be configured to convert the power of the battery 20 into low-voltage power and provide the low-voltage power to the sub-battery 50. The low voltage DC-DC converter 40 may have an insulating converter topology substantially the same as or similar to the DC converter 11 described above.

In particular, the low voltage DC-DC converter 40 may include: a third bridge circuit 41 having a plurality of switching elements S9~S12 and configured to convert a voltage of the battery 20 into an AC voltage; a transformer 43 configured to convert the width of the AC voltage converted by the third bridge circuit 41 into a predetermined turn ratio; and a fourth bridge circuit 45 having a plurality of switching elements S13 and S14, and configured to convert the AC voltage having the width converted by the transformer 43 back into a DC voltage and then provide the DC voltage to the sub-battery 50. The fourth bridge circuit 45 may be a half bridge circuit, but is not limited thereto and may be implemented as various types of bridge circuits or switching elements configured to convert AC power into DC power.

Similar to the DC converter 115 described above, the low voltage DC-DC converter 40 may also be operated in two directions. In other words, the low voltage DC-DC converter 40 may be configured to convert a voltage in an opposite direction (hereafter, a backward direction) to the direction of power flow from the battery 20 to the sub-battery 50 (hereafter, referred to as a forward direction). For example, the DC voltage of the sub-battery 20 may be converted into an AC voltage and then input to the transformer 43 by the fourth bridge circuit 45, the transformer 43 may be configured to convert the AC voltage input from the fourth bridge circuit 45 and output the AC voltage to the third bridge circuit 41 based on the turn ratio of the transformer 43, and the third bridge circuit 41 may be configured to convert the AC voltage input from the transformer 113 and then apply the voltage to the battery 20.

An exemplary embodiment of the present invention may further include a charge power input terminal Ti to which an external charging facility 30 is connected, and a relay R connected to the charger 10. Various exemplary embodiments of the present invention are characterized by initially charging the DC capacitor Cdc1 by converting the power of the sub-battery 50 to be applied to the DC capacitor Cdc1 before an AC charge power from the outside is supplied when the battery 20 is charged, using the two-directional operation of the low voltage DC-DC converter 40 and the DC converter 115 in the charger 10.

When an external charging facility is connected to the charge power input terminal Ti and a signal for starting to charge the battery is received by input from a user or a predetermined timer, the controller 100 may be configured to operate the low voltage DC-DC converter 40 and the DC converter 115 in the charger 10 in the backward direction to charge the DC capacitor Cdc1 in the charger 10 up to a predetermined initial charge voltage. In other words, the controller 100 may be configured to increase the voltage of the sub-battery 50 and apply the voltage to the terminal at the battery 20 of the DC converter 11 in the charger by adjusting the duties of the switching elements of the fourth bridge circuit 45 and the third bridge circuit 41 to operate the low voltage DC-DC converter 40 in the backward direction. Further, the controller 100 may be configured to convert the magnitude of the voltage at the battery 20 of the DC converter 11 to a magnitude that corresponds to a predetermined DC charge voltage to apply the DC charge voltage to a terminal at the DC capacitor Cdc1 of the DC converter 11 by adjusting the duties of the second bridge circuit 115 and the first bridge circuit 111 of the DC converter 11 in the charger 10.

Accordingly, the DC capacitor Cdc1 in the charger 10 may be initially charged before charge power is supplied, without using a separate initial charge resistor. In other words, in the related art, to prevent a DC voltage converted from a charge power from the outside from being rapidly applied to the DC converter Cdc1 and the DC capacitor Cdc1 malfunctioning, a separate initial charge resistor is required that is connected to an external charge power input terminal of the charger 10 only in the early stage of charging. However, according to the present invention, the power stored in the sub-battery 50 of a vehicle may be applied to the DC converter Cdc1 by operating the DC converter 15 in the charger 10 and the low voltage DC-DC converter 40 provided in an environmental-friendly vehicle in the backward direction, and thus, the DC converter Cdc1 may be charged without a separate initial charge resistor.

When the DC capacitor Cdc1 in the charger 10 completes being charged up to a predetermined initial charge voltage, the controller 100 may be configured to change the connection state of the relay R to apply AC charge power from the outside to the charger 10, and may be configured to operate the DC converter 11 in the charger 10 in the forward direction to charge the battery 20. As another example, the controller 100 may be configured to charge the DC capacitor Cdc1 without a separate initial charge resistor by fixing the duties of the first to third bridge circuits 111, 115, and 41 and adjusting the duty of the fourth bridge circuit 45.

In other words, it may be possible to set turning-on/off periods of switches in advance based on the direction of current flow according to turning-on/off of the switches in the bridge circuits 111, 114, 41, and 45, and then turn on/off the switching element of the first to third bridge circuits 111, 115, and 41 and adjust the duties of only the switching elements in the fourth bridge circuit 45. For example, the controller 100 may be configured to turn the switching elements S10 and S11 and the switching elements S9 and S12 of the third bridge circuit 41 on/off with a duty of 50% in a complementary relationship, operate the switching elements S5 and S8 of the second bridge circuit 115 in the same state as the switching elements S10 and S11, operate the switching elements S6 and S7 of the second bridge circuit 115 in the same state as the switching elements S9 and S12, operate the switching elements S1 and S4 of the first bridge circuit 111 in the same state as the switching elements S10 and S11, and operate the switching elements S2 and S3 of the first bridge circuit 111 in the same state as the switching elements S9 and S12.

The controller 100 may be configured to turn on the switching element S14 of the fourth bridge circuit 45 in a period in which the switching elements S10 and S11 are turned on, and adjust the time for which turning-on is maintained, that is, adjust the duty. Similarly, the controller 100 may be configured to turn on the switching element S13 of the fourth bridge circuit 45 in a period in which the switching elements S9 and S12 are turned on, and adjust the time for which turning-on is maintained.

As the controller 100 turns on/off the switching elements in the bridge circuits, power that is induced to a secondary side of the transformer 43 by turning-on/off of the switching elements of the fourth bridge circuit 45 may be provided to the DC capacitor Cdc1 based on polarities without changing the duties of the switching elements in the first to third bridge circuits 111, 115, and 41, whereby the DC capacitor Cdc1 may be charged. In particular, the controller 100 may prevent a voltage having an excessive magnitude over the internal voltage of the DC capacitor Cdc1 from being applied, by appropriately adjusting the magnitude of the voltage that is provided to the DC capacitor Cdc1 by adjusting the duties of the switching elements of the fourth bridge circuit 45.

Figure 2:
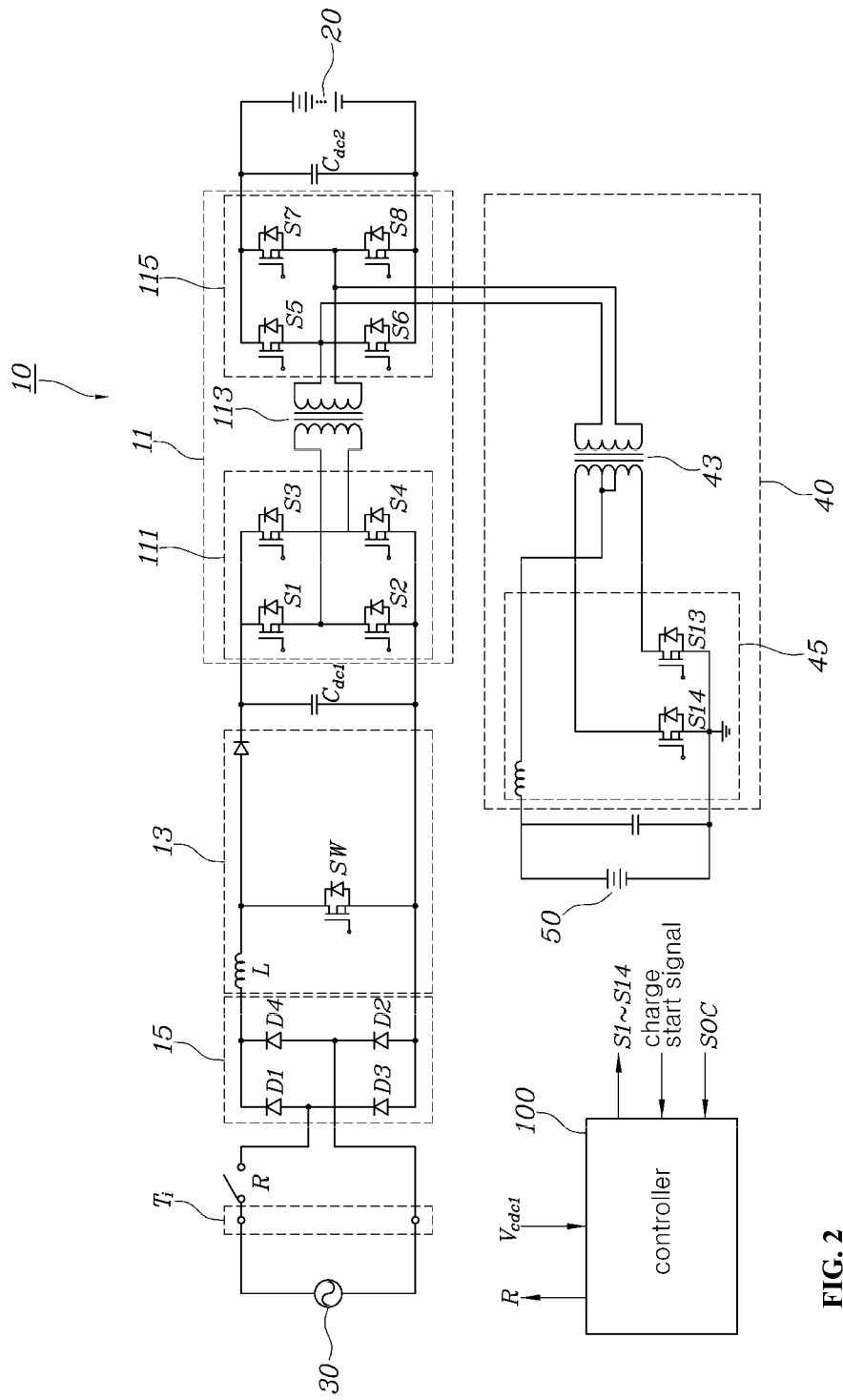
FIG. 2 is a circuit diagram showing a system of charging a battery of a vehicle according to another exemplary embodiment of the present invention.

FIG. 2 is a circuit diagram showing a system of charging a battery of a vehicle according to another exemplary embodiment of the present invention. In the exemplary embodiment shown in FIG. 2, the charger and the low voltage DC-DC converter 40 share the second bridge circuit 115 in the DC converter 11 of the charger 10. In particular, similarly, an AC voltage is formed by adjusting the duty of the bridge circuit 45 connected with the sub-battery 50 of the low voltage DC-DC converter 40 and the formed AC voltage may be applied to the wire at the battery 20 of the transformer 113 in the DC converter 11 with the width thereof changed by the transformer 43. The transformer 113 may be configured to convert the width of the applied voltage and then apply the voltage to the first bridge circuit 111 and a DC voltage may be applied to the Dc capacitor Cdc1 by adjusting the duty of the first bridge circuit 111, whereby the DC capacitor Cdc1 may be charged with a predetermined initial charge voltage.

Obviously, as described in the exemplary embodiment shown in FIG. 1, it may be possible to charge the DC capacitor Cdc1 while preventing a voltage having an excessive magnitude over the internal voltage of the DC capacitor Cdc1 from being applied, by fixing the duties of the switching elements of the first and second bridge circuits 111 and 115 and adjusting the duty of the bridge circuit 45 connected with the sub-battery 50.

Figure 3:
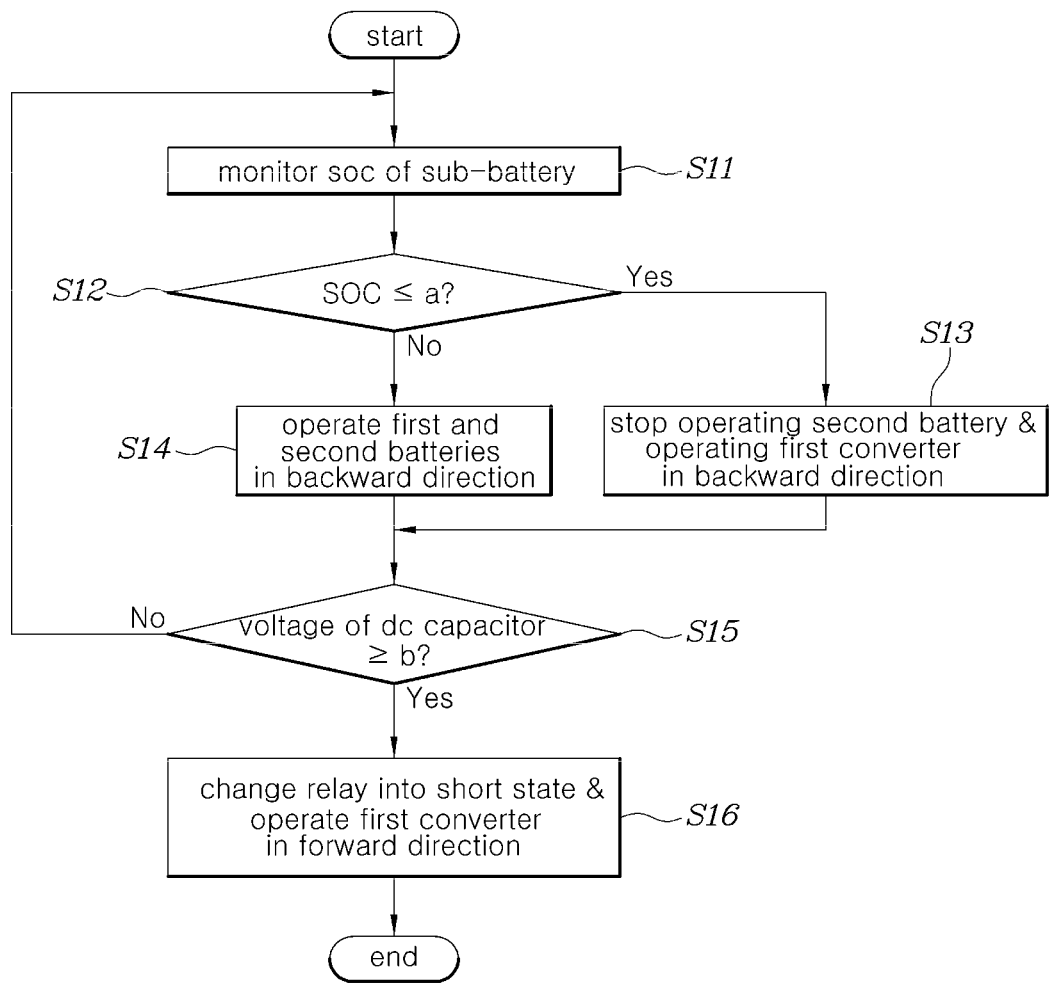
FIG. 3 is a flowchart showing of charging a method for controlling a system of charging a battery of a vehicle according to an exemplary embodiment of the present invention.

FIG. 3 is a flowchart showing of charging a method for controlling a system of charging a battery of a vehicle according to an exemplary embodiment of the present invention. Referring to FIG. 3, a method for controlling a system of charging a battery of a vehicle according to an exemplary embodiment of the present invention may monitor the state of charge (SOC) of the sub-battery 50 when the controller 100 receives a charge start signal (S11). As described above, various exemplary embodiments of the present invention charge the DC capacitor Cdc1 in the charger 10 using the power stored in the sub-battery 50, and thus, the amount of the energy stored in the sub-battery 50 should be sufficient to charge the DC capacitor Cdc1.

When the SOC of the sub-battery 50 is greater than a predetermined reference value 'a', as the result of monitoring (S11), that is, in response to determining that the amount of the energy stored in the sub-battery 50 is sufficient to charge the DC capacitor Cdc1, the controller 100 may be configured to initially charge the DC capacitor Cdc1 by converting the voltage of the sub-battery 50 into a voltage for charging the DC capacitor Cdc1 and then applying the voltage to the DC capacitor Cdc1 by operating the low voltage DC-DC converter 40 and the DC converter 11 in the charger 10 in the backward direction (S13).

In step S13, as described above, the adjusting of the duties of the switching elements in the bridge circuits or the adjusting the duties of the switching elements in the bridge circuit 45 connected to the sub-battery 50 and fixing the duties of the switching elements in the other bridge circuit may be applied. When the SOC of the sub-battery 50 is the predetermined reference value 'a' or less, as the result of monitoring (S11), that is, in response to determining that the amount of the energy stored in the sub-battery 50 is insufficient to charge the DC capacitor Cdc1, the controller 100 may be configured to initially charge the DC capacitor Cdc1 by converting the voltage of the high-voltage battery 20 into a voltage for charging the DC capacitor Cdc1 and then applying the voltage to the DC capacitor Cdc1 by operating the DC converter 11 in the charger 10 in the backward direction without operating the low voltage DC-DC converter 40 in the backward direction (S14).

The controller 100 may be configured to monitor the voltage of the DC capacitor Cdc1 while the DC capacitor Cdc1 is charged through step S13 and step S14, and input the AC charge power provided from the external charging facility 30 to the charger 10 by changing the relay R into a short state that is an open state after the DC capacitor Cdc1 is charged up to a predetermined initial charge voltage. The controller 100 may further be configured to charge the battery 20 by operating the DC converter 11 such that the charger 10 generates power flow in the forward direction and power converted from the AC charge power is provided to the battery 20.

Although the present invention was described above with reference to specific exemplary embodiments, it would be apparent to those skilled in the art that the present invention may be changed and modified in various ways within the claims.

What is claimed is:

1. A system of charging a battery of a vehicle, the system comprising:
   a charger including a direct current (DC) capacitor to which a DC voltage converted from an alternating current (AC) charge voltage is applied, and a first DC converter configured to convert a magnitude of a voltage of the DC capacitor;
   a first battery connected to the first DC converter and charged with a DC voltage converted by the first DC converter;
   a second DC converter connected to the battery of the vehicle and configured to convert a magnitude of a voltage of the first battery;
   a second battery configured to receive a DC voltage converted by the second DC converter; and
   a controller configured to charge the DC capacitor up to a predetermined initial charge voltage using power stored in the second battery by operating the second DC converter and the first DC converter in a backward direction before the AC charge voltage is provided to the charger.

2. The system of claim 1, wherein:
   the first DC converter includes a first bridge circuit and a second bridge circuit each having a plurality of switching elements, and a first transformer disposed between the first bridge circuit and the second bridge circuit and configured to convert and transmit a voltage width between the first bridge circuit and the second bridge circuit;
   the second DC converter includes a third bridge circuit and a fourth bridge circuit each having a plurality of switching elements, and a second transformer disposed between the third bridge circuit and the fourth bridge circuit and configured to convert and transmit a voltage width between the third bridge circuit and the fourth bridge circuit; and
   the first bridge circuit is connected to the DC capacitor, the second bridge circuit is connected to the first battery, the third bridge circuit is connected to the first battery, and the fourth bridge circuit is connected to the second battery.

3. The system of claim 2, wherein the controller is configured to charge the DC capacitor up to the predetermined initial charge voltage by converting and applying the DC voltage of the second battery to the DC capacitor by operating the switching elements included in the first bridge circuit, the second bride circuit, the third bridge circuit, and the fourth bridge circuit.

4. The system of claim 2, wherein the controller is configured to charge the DC capacitor up to the predetermined initial charge voltage by converting and applying the Dc voltage of the second battery to the DC capacitor by fixing duties of the switching elements included in the first bridge circuit, the second bridge circuit, and the third bridge circuit and adjusting duties of the switching elements included in the fourth bridge circuit.

5. The system of claim 1, wherein:
the first DC converter includes a first bridge circuit and a second bridge circuit each having a plurality of switching elements, and a first transformer disposed between the first bridge circuit and the second bridge circuit and configured to convert and transmit a voltage width between the first bridge circuit and the second bridge circuit;
the second DC converter includes a third bridge circuit having a plurality of switching elements, and a second transformer disposed between the third bridge circuit and the second bridge circuit and configured to convert and transmit a voltage width between the third bridge circuit and the fourth bridge circuit; and
the first bridge circuit is connected to the DC capacitor, the second bridge circuit is connected to the first battery, and the third bridge circuit is connected to the second battery.

6. The system of claim 5, wherein the controller is configured to charge the DC capacitor up to the predetermined initial charge voltage by converting and applying the DC voltage of the second battery to the DC capacitor by operating the switching elements included in the first bridge circuit, the second bridge circuit, and the third bridge circuit.

7. The system of claim 5, wherein the controller is configured to charge the DC capacitor up to the predetermined initial charge voltage by converting and applying the DC voltage of the second battery to the DC capacitor by fixing duties of the switching elements included in the first bridge circuit and the second bridge circuit and adjusting duties of the switching elements included in the third bridge circuit.

8. The system of claim 1, further comprising:
a charge input terminal to which the AC charge voltage is input; and
a relay connected between the charge input terminal and the charger,
wherein the controller is configured to change the relay into a short state after charging the DC capacitor up to a predetermined initial charge voltage, using power stored in the second battery by operating the second DC converter and the first DC converter in a backward direction with the relay open, when receiving a charge start signal for starting to charge the first battery.

9. The system of claim 1, wherein the controller is configured to monitor a state of charge of the second battery, and charge the DC capacitor up to a predetermined initial charge voltage using power stored in the first battery by operating the first DC converter in a backward direction before the AC charge voltage is provided to the charger when the state of charge of the second battery is less than a predetermined reference value.

10. A method for controlling a system of charging a battery of a vehicle, the method comprising:
receiving, from a controller, a charge start signal for starting to charge a first battery with a relay open, wherein the first battery is connected to a first direct current (DC) converter and is to be charged with a DC voltage converted by the first DC converter;
charging, controlled by the controller, a DC capacitor of a charger up to a predetermined initial charge voltage using power stored in a second battery by operating the first DC converter and a second DC converter in a backward direction, wherein the DC capacitor is configured to receive a DC voltage converted from an alternating current (AC) charge voltage and wherein the second DC converter is connected to the battery of the vehicle and converts a magnitude of a voltage of the first battery; and
charging, controlled by the controller, the first battery by changing the relay into a short state and operating the first DC converter in a forward direction to apply a voltage converted from the AC charge voltage to the first battery,
wherein the first DC converter converts the magnitude of a voltage of the DC capacitor,
wherein the relay is connected between a charge input terminal and the charger, the charge input terminal is a terminal to which the AC charge voltage is input, and
wherein the second battery receives a DC voltage provided by the second DC converter.

11. The method of claim 10, further comprising:
monitoring, by the controller, a state of charge of the second battery before the charging of the first battery; and
charging, controlled by the controller, the DC capacitor up to a predetermined initial charge voltage using power stored in the first battery by operating the first DC converter in a backward direction when the state of charge of the second battery is less than a predetermined reference value.

* * * * *